United States Patent
Jufuku et al.

(10) Patent No.: US 7,534,520 B2
(45) Date of Patent: May 19, 2009

(54) FUEL CELL SYSTEM

(75) Inventors: Yasunobu Jufuku, Mishima (JP); Minobu Mizuno, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 11/661,249

(22) PCT Filed: Feb. 8, 2006

(86) PCT No.: PCT/JP2006/302588

§ 371 (c)(1),
(2), (4) Date: Feb. 27, 2007

(87) PCT Pub. No.: WO2006/085671

PCT Pub. Date: Aug. 17, 2006

(65) Prior Publication Data
US 2007/0259243 A1 Nov. 8, 2007

(30) Foreign Application Priority Data
Feb. 9, 2005 (JP) ............... 2005-033131

(51) Int. Cl.
*H01M 8/04* (2006.01)
(52) U.S. Cl. .......................... 429/34; 429/12
(58) Field of Classification Search ........ None
See application file for complete search history.

(56) References Cited

U.S. PATENT DOCUMENTS

2002/0187380 A1   12/2002   Tanaka et al.
2002/0187382 A1   12/2002   Nishiumi et al.
2003/0108784 A1*  6/2003   Enjoji et al. .................. 429/34

FOREIGN PATENT DOCUMENTS

| JP | 2000-313239 |   | 11/2000 |
| JP | 2002-362164 |   | 12/2002 |
| JP | 2002-362470 |   | 12/2002 |
| JP | 2002-367637 |   | 12/2002 |
| JP | 2002-367664 |   | 12/2002 |
| JP | 2002-367666 | A | 12/2002 |
| JP | 2003-146087 |   | 5/2003  |
| JP | 2003-173790 |   | 6/2003  |
| JP | 2003-182379 |   | 7/2003  |
| JP | 2004-055384 |   | 2/2004  |
| JP | 2004-127787 | A | 4/2004  |
| JP | 2005-108813 | A | 4/2005  |

* cited by examiner

*Primary Examiner*—John S Maples
(74) *Attorney, Agent, or Firm*—Kenyon & Kenyon LLP

(57) ABSTRACT

A fuel cell system according to the present invention comprises fuel cell stacks for generating electrical power upon receipt of hydrogen gas and oxidized gas; an end plate to which the fuel cell stacks are fastened; hydrogen system parts (hydrogen inlet valve, regulator, hydrogen pump, gas-liquid separator, hydrogen discharge valve, hydrogen supply pipe, hydrogen discharge pipe, distribution pipes, and connection pipes) for supplying hydrogen gas to the fuel cell stacks; and a stack case for housing at least the fuel cell stacks and hydrogen system parts. The hydrogen system parts are congregated and mounted on the end plate.

3 Claims, 3 Drawing Sheets

FUEL CELL SYSTEM

This is a 371 national phase application of PCT/JP2006/302588 filed 08 Feb. 2006, claiming priority to Japanese Patent Application No. 2005-033131 filed 09 Feb. 2005, the contents of which are incorporated herein by reference.

TECHNICAL FIELD

The present invention relates to a fuel cell system.

BACKGROUND ART

A conventional technology disclosed, for instance, by Japanese Patent Laid-Open No. 2002-367637 enhances the safety of a hydrogen piping by placing a hydrogen system piping for fuel cells in the innermost position of a vehicle.

However, the technology disclosed by Japanese Patent Laid-Open No. 2002-367637 addresses the safety of hydrogen system auxiliaries by providing, for instance, auxiliary vibration control and rigidity enhancement outside a stack case although it considers the safety of the piping. Therefore, if, for instance, a fuel-cell-mounted vehicle crashes, the hydrogen system auxiliaries positioned around the fuel cells may move due to impact and become damaged. Further, when the vehicle crashes, the joints between the auxiliaries may become distorted, cracked, and damaged, thereby allowing hydrogen gas to leak out.

Oxygen system parts for supplying/discharging oxidized gas and cooling system parts for supplying/discharging a coolant are positioned around the fuel cells. If these parts become damaged, for instance, upon a crash, the oxidized gas and coolant leak out to degrade the reliability of full cells.

The present invention has been made to solve the above problems. It is an object of the present invention to properly protect the auxiliaries, piping, and other components in a fuel cell system and properly prevent a fluid from leaking out of the auxiliaries, piping, and other components.

DISCLOSURE OF INVENTION

According to a first aspect of the present invention, there is provided a fuel cell system comprising fuel cell stacks for generating electrical power upon receipt of hydrogen gas and oxidized gas; an end plate to which the fuel cell stacks are fastened; hydrogen system parts for supplying hydrogen gas to the fuel cell stacks; and a stack case for housing at least the fuel cell stacks and the hydrogen system parts, wherein the hydrogen system parts are congregated and mounted on the end plate.

Since the hydrogen system parts are housed within the stack case, congregated, and mounted on the end plate, it is possible to prevent the hydrogen system parts from being damaged by external force. Particularly, the end plate has high rigidity for preventing the hydrogen system parts from being relatively moved due to impact caused by external force. It is therefore possible to properly prevent the hydrogen system parts and their joints from being damaged. As a result, the reliability of the fuel cell system can be enhanced.

According to a second aspect of the present invention, there is provided the improved fuel cell system as described above, wherein the hydrogen system parts include auxiliaries or piping for supplying hydrogen gas to the fuel cell stacks.

It is possible to prevent the auxiliaries or piping for supplying hydrogen gas to the fuel cell stacks from being damaged by external force.

According to a third aspect of the present invention, there is provided the improved fuel cell system as described above, wherein the hydrogen system parts are mounted on a support member for congregation purposes; and wherein the support member is fastened to the end plate.

Since the hydrogen system parts are mounted on the support member for congregation purposes, the hydrogen system parts can be mounted on the end plate with ease. Further, function checks can be performed on only the hydrogen system parts while they are mounted on the support member. Consequently, it is possible to enhance the efficiencies of an assembly process and inspection process.

According to a fourth aspect of the present invention, there is provided the improved fuel cell system as described above, wherein the stack case houses oxygen system parts for supplying oxidized gas to the fuel cell stacks or cooling system parts for supplying a coolant to the fuel cell stacks.

Since the oxygen system parts or cooling system parts are housed in the stack case, it is possible to prevent the oxygen system parts or cooling system parts from being damaged by external force. Consequently, the reliability of the fuel cell system can be enhanced.

According to a fifth aspect of the present invention, there is provided the improved fuel cell system as described above, wherein the fuel cell system is mounted in a vehicle.

Even when a fuel-cell-mounted vehicle crashes, it is possible to prevent the hydrogen system parts from being damaged.

BEST MODE FOR CARRYING OUT THE INVENTION

Figure 1:
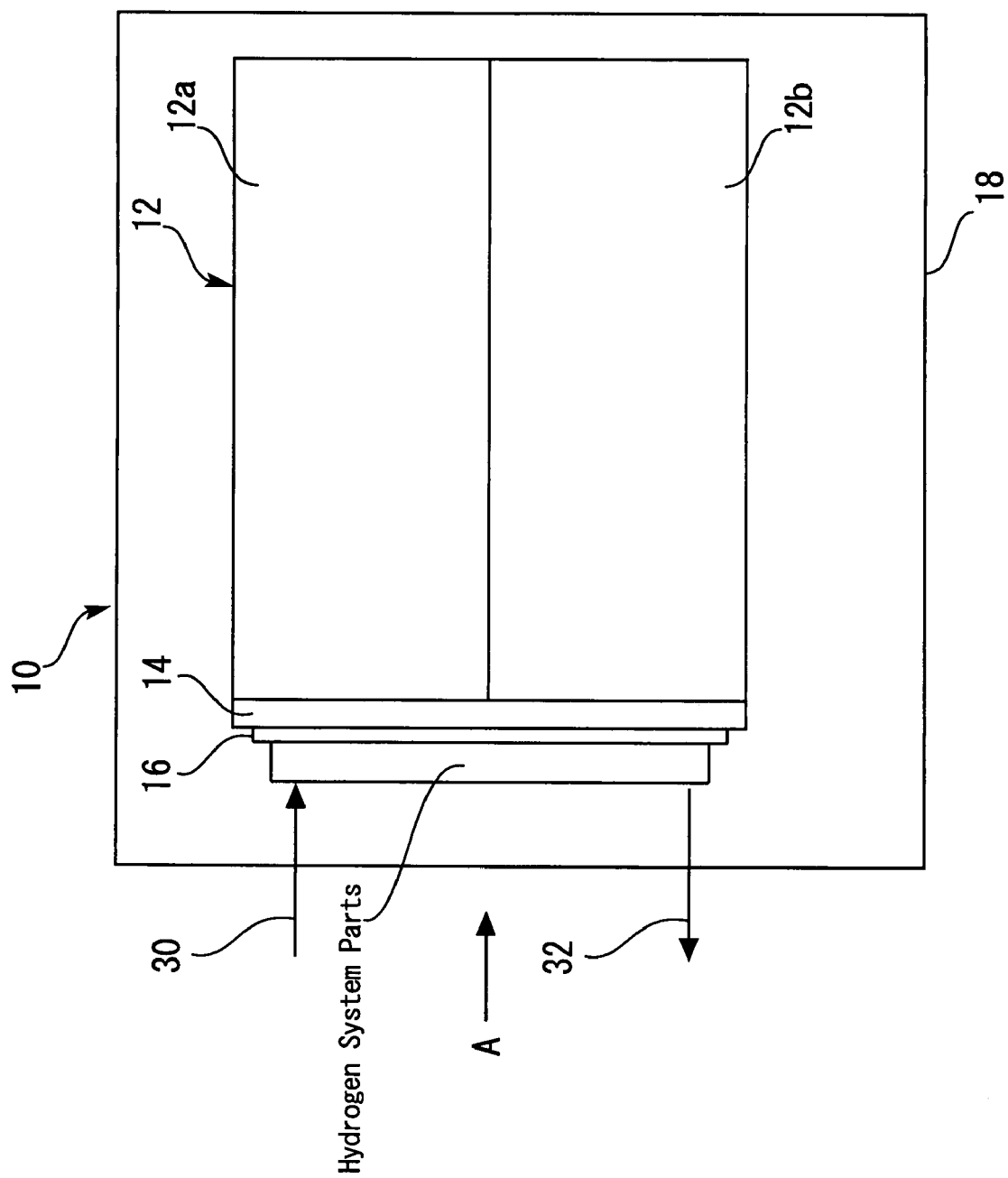
FIG. 1 is a plan view illustrating a fuel cell system according to an embodiment of the present invention.

An embodiment of the present invention will now be described in detail with reference to the accompanying drawings. Elements common to the drawings are identified by the same reference numerals and will not be described repeatedly. The embodiment described below is an example of the present invention and does not define the scope of the present invention.

FIG. 1 is a plan view illustrating a fuel cell system 10 according to an embodiment of the present invention. The fuel cell system 10 is mainly mounted in a fuel cell automobile. The fuel cell system 10 includes fuel cells 12. The fuel cells 12 are grouped into two fuel cell stacks 12a, 12b. An end plate 14 is positioned at one end of the fuel cell stacks 12a, 12b.

In the present embodiment, the fuel cell stacks 12a, 12b are proton exchange membrane fuel cells (PEMFCs) having a solid polymer separation membrane. They are formed by stacking a plurality of cell layers that are composed of an electrolyte membrane, an anode, a cathode, and a separator. A path for flowing hydrogen gas is formed between the anode and separator. A path for flowing oxidized gas is formed between the cathode and separator. The electrolyte membrane is a proton conductive ion exchange membrane that is formed by a fluorinated solid polymer material. The anode and cathode are both formed by a carbon cloth that is woven of carbon fiber. The separator is formed by a gas-impermeable conductive member such as compact carbon, which is rendered gas-impermeable by carbon compression.

The two fuel cell stacks 12a, 12b are fastened to the end plate 14. The end plate 14 includes a supply section, which supplies hydrogen gas and oxidized gas to the fuel cell stacks 12a, 12b, and a discharge section, which discharges reacted gases from the fuel cell stacks 12a, 12b. The end plate 14 also includes a supply section and discharge section for a coolant that circulates within the fuel cell stacks 12a, 12b.

A bracket (support member) 16 is attached to the end plate 14. The bracket 16 is made of a plate material or the like and fastened to the end plate 14 with bolts or other fasteners. As schematically shown in FIG. 1, hydrogen system parts are mounted on the bracket 16.

The fuel cells 12 are surrounded by a stack case 18. The fuel cells 12, end plate 14, bracket 16, hydrogen system parts, and other component members around the fuel cells 12 are housed in the stack case 18.

Figure 2:
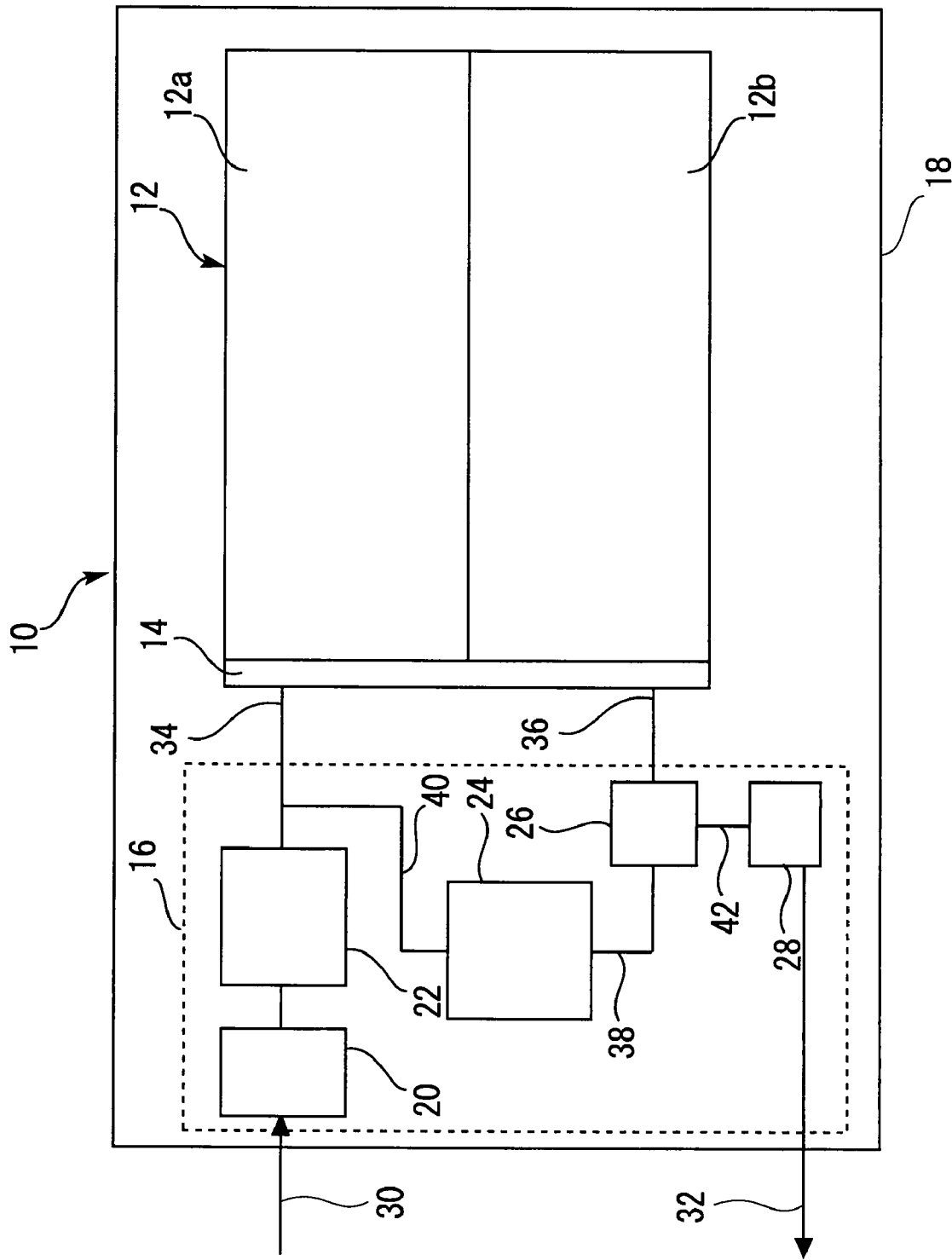
FIG. 2 is a detailed schematic diagram illustrating the configuration of the fuel cell system.

FIG. 2 is a detailed schematic diagram illustrating the configuration of the fuel cell system 10. It particularly shows the details of the hydrogen system parts that are mounted on the bracket 16.

As shown in FIG. 2, the hydrogen system parts are mounted on the bracket 16. The hydrogen system parts include a hydrogen inlet valve 20, a regulator 22, a hydrogen pump 24, a gas-liquid separator 26, a hydrogen discharge valve 28, and other auxiliaries, and pipes connected to such auxiliaries (a hydrogen supply pipe 30, a hydrogen discharge pipe 32, distribution pipes 34, 36, and connection pipes 38, 40, 42). In the present embodiment, the hydrogen system parts are modularized by mounting them on the bracket 16, and housed within the stack case 18.

As shown in FIG. 2, the hydrogen supply pipe 30 is introduced from the outside of the stack case 18. The hydrogen supply pipe 30 is connected to a hydrogen tank (not shown in FIGS. 1 and 2) that is positioned outside the stack case 18.

The hydrogen supply pipe 30 is connected to the distribution pipe 34 via the hydrogen inlet valve 20 and regulator 22. The distribution pipe 34 is introduced into the fuel cells 12. Hydrogen gas in the hydrogen tank is supplied to the hydrogen inlet vale 20 and regulator 22 via the hydrogen supply pipe 30, and forwarded into the fuel cells 12 via the distribution pipe 34.

The hydrogen gas supplied into the fuel cells 12 reacts within the fuel cells 12. The reacted gas is discharged from the distribution pipe 36. The distribution pipe 36 is connected to the gas-liquid separator 26. The gas-liquid separator 26 separates water from the reacted gas. The separated water is supplied to the hydrogen discharge valve 28 through the connection pipe 42.

The hydrogen discharge valve 28 opens with predefined timing. When the hydrogen discharge valve 28 opens, the water in the hydrogen discharge valve 28 and part of the reacted hydrogen gas are supplied to the hydrogen discharge pipe 32. The water and gas supplied in this manner are then discharged out of the stack case 18. The hydrogen discharge pipe 32 is connected to an exhaust gas processing device (not shown in FIGS. 1 and 2), which is positioned outside the stack case 18. The gas and water discharged from the hydrogen discharge pipe 32 are subjected to dilution and other predetermined processes in the exhaust gas processing device and discharged to the outside.

The gas from which the water has been separated by the gas-liquid separator 26 is supplied to the hydrogen pump 24 via the connection pipe 38. The hydrogen pump 24 supplies the gas, which is received from the gas-liquid separator 26, to the distribution pipe 34 via the connection pipe 40. As described above, the system according to the present embodiment includes an anode gas circulation system so that the reacted hydrogen gas discharged from the fuel cells 12 is supplied again to the fuel cells 12. Unreacted hydrogen gas, which did not react in the fuel cells 12, is supplied again to the fuel cells 12 to ensure that the supplied hydrogen gas properly reacts.

Figure 3:
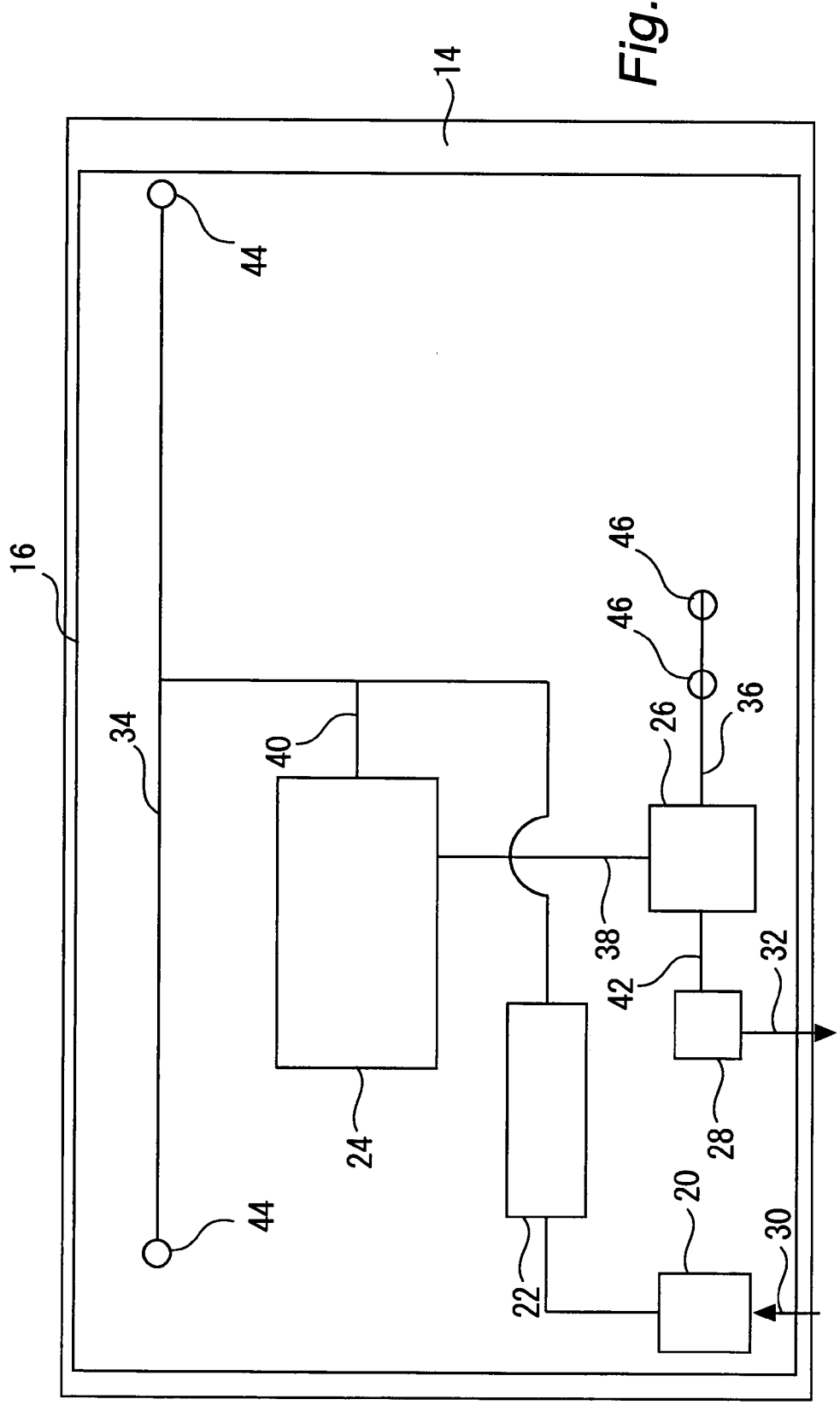
FIG. 3 is a schematic diagram that illustrates the inside of the stack case of the fuel cell system as viewed in the direction of arrow A in FIG. 1.

FIG. 3 is a schematic diagram that illustrates the inside of the stack case 18 of the fuel cell system 10 as viewed in the direction of arrow A in FIG. 1. As shown in FIG. 3, the bracket 16 is made of a plate member that is positioned in parallel with the end plate 14. Further, the bracket 16 is extended in the planar direction of the end plate 14. FIG. 2 schematically shows how the hydrogen system parts are positioned. In reality, however, the hydrogen system parts are mounted on the surface of the bracket 16 as shown in FIG. 3. Therefore, the space of hydrogen system parts can be minimized in the direction of the thickness of the end plate 14 as shown in FIG. 1. This makes it possible to reduce the size of the stack case 18.

As shown in FIG. 3, the end of the distribution pipe 34 toward the fuel cells 12 is connected to two hydrogen supply sections 44, which are mounted on the end plate 14. The hydrogen gas forwarded to the distribution pipe 34 is supplied from the two hydrogen supply sections 44 to the inside of the fuel cells 12. The end of the distribution pipe 36 toward the fuel cells 12 is connected to two hydrogen discharge sections 46, which are mounted on the end plate 14. The reacted gas discharged from the fuel cells 12 is discharged from the hydrogen discharge sections 46 to the distribution pipe 36.

Oxygen system parts for supplying oxidized gas to the fuel cells 12 and discharging it from the fuel cells 12 and cooling system parts for supplying a coolant to the fuel cells 12 and discharging it from the fuel cells 12 are positioned near the bracket 16 although they are not shown in FIGS. 1 to 3. The oxygen system parts and cooling system parts include an oxidized gas or coolant supply pump, pressure regulating valve, and the like. FIGS. 1 to 3 indicate that only the hydrogen system parts are mounted on the bracket 16. However, the oxygen system parts and cooling system parts may be mounted on the bracket 16.

In the fuel cell system 10 according to the present embodiment, which is configured as described above, the hydrogen system parts are mounted on the bracket 16 and housed in the stack case 18. Therefore, the hydrogen system parts can be protected by the stack case 18 when, for instance, a vehicle crashes. This makes it possible to enhance the reliability of the hydrogen system parts.

When the fuel cell system 10 is to be mounted in a vehicle such as a fuel cell automobile, it is usually housed in an engine compartment (inside a food) of the vehicle. If, in such an instance, the hydrogen system parts in the engine compartment are exposed and a vehicle in which the fuel cell system 10 is mounted becomes damaged due, for instance, to a crash, the hydrogen system parts may become damaged by crash-induced impact or by a collision between the hydrogen system parts and the other parts within the engine compartment (such as a radiator, cooling fan, and transmission). If the hydrogen system parts become damaged in the above manner, the hydrogen gas may leak out because high-pressure hydrogen gas in the hydrogen tank is supplied to the hydrogen system parts.

In the present embodiment, the hydrogen system parts are housed in the stack case 18 and only the hydrogen gas inlet and outlet are positioned outside the stack case 18. Therefore, even when, for instance, a vehicle in which the fuel cell system 10 is mounted becomes damaged due to a crash, the hydrogen system parts can be protected by the stack case 18. Consequently, the hydrogen system parts can be properly protected even when the stack case 18 is impacted due to a crash or the like or when the other parts scatter or collide against the outside of the stack case 18.

Further, the hydrogen system parts are mounted on the bracket 16, which is fastened to the highly rigid end plate 14. Therefore, the bracket 16 and end plate 14 do not become distorted even when the hydrogen system parts are impacted due to a crash or the like. Consequently, even when a crash or the like occurs, it is possible to properly prevent the joints of the hydrogen system parts from being cracked or otherwise broken because no unbalanced load is imposed on the hydrogen system parts fastened to the bracket 16. Further, since the bracket 16 enhances the rigidity of the end plate 14, the end plate 14 can be reduced in weight as a secondary effect.

Furthermore, when the points of inserting the hydrogen supply pipe 30 and hydrogen discharge pipe 32 into the stack case 16 are positioned rearward in the direction of vehicle travel or otherwise positioned to ensure that the hydrogen supply pipe 30 and hydrogen discharge pipe 32 are not easily damaged by the other parts or the like at the time of a vehicle crash, it is possible to prevent the hydrogen supply pipe 30 and hydrogen discharge pipe 32, which are positioned outside the stack case 18, from being cracked or otherwise damaged.

Consequently, it is possible to prevent the hydrogen system parts from being damaged upon a vehicle crash or the like and properly avoid hydrogen gas leakage. This makes it possible to enhance the reliability prevailing at the time of a crash. Further, since the hydrogen system parts are housed in the stack case 18, the user does not directly touch the hydrogen system parts. It is therefore possible to properly avoid a failure or other problem that may be caused, for instance, by an incorrect operation or inspection.

Further, when the hydrogen system parts are mounted on the bracket 16, a plurality of the hydrogen system parts can be handled while they are integrated (assembled) on the bracket 16. This eliminates the need for individually installing a plurality of the hydrogen system parts around the fuel cells 12. The hydrogen system parts can be installed for the fuel cells 12 simply by mounting the bracket 16 on the end plate 14. Consequently, it is not necessary to install a complicated piping or the like for the installation of a plurality of the hydrogen system parts after the fuel cells 12 are installed in the engine compartment. This simplifies the assembly process. In addition, function checks can be performed on the hydrogen system parts while they are mounted (assembled) on the bracket 16. Therefore, even before the hydrogen system parts are installed for the fuel cells 12, function checks can be performed on them while they are mounted (assembled) on the bracket 16. As a result, since the hydrogen system parts are assembled and mounted on the bracket 16, the present embodiment makes it possible to simplify the inspection and assembly processes and reduce the manufacturing cost.

Furthermore, the hydrogen system parts are mounted in a relatively small area on the bracket 16. Therefore, the pipes (hydrogen supply pipe 30, hydrogen discharge pipe 32, distribution pipes 34, 36, and connection pipes 38, 40, 42) for connecting the auxiliaries of the hydrogen system parts can be shorter than when the hydrogen system parts are individually installed for the fuel cells 12. This makes it possible to properly prevent the piping from being cracked or deformed at the time of a crash. In addition, the amount of hydrogen gas remaining in the piping while the fuel cells 12 are stopped can be minimized to permit effective use of hydrogen gas.

Moreover, the interior of the stack case 18 is kept warm by the heat generated by the fuel cells 12. Therefore, as far as the hydrogen system parts, oxygen system parts, and cooling system parts are housed in the stack case 18, it is possible to prevent the water generated and discharged from the fuel cells 12 from freezing even while the vehicle travels at a low temperature.

In the configuration described above, the bracket 16 is fastened to the end plate 14 with the hydrogen system parts mounted on the bracket 16. However, an alternative configuration may be employed so that the hydrogen system parts are directly mounted on the end plate 14 to integrate the end plate 14 and hydrogen system parts into a single whole.

In the present embodiment, which has been described above, the bracket 16 is fastened to the end plate 14 for the fuel cells 12 with the hydrogen system parts mounted on the bracket 16. Therefore, the hydrogen system parts can be housed in the stack case 18. This ensures that the hydrogen system parts are not exposed near the fuel cells 12. Thus, it is possible to prevent the hydrogen system parts from being damaged at the time of a vehicle crash or the like. Consequently, the reliability of the fuel cell system 10 can be enhanced.

Further, the hydrogen system parts can easily be installed for the fuel cells 12 because they are mounted on the bracket 16 for integration purposes. In addition, the hydrogen system parts on the bracket 16 are interconnected with piping and other connections established. Therefore, function checks can easily be performed on only the hydrogen system parts while they are rendered integral with the bracket 16. This makes it possible to simplify the assembly and inspection processes and reduce the manufacturing cost.

The present embodiment has been described on the assumption that it is applied to a fuel cell system 10 that is mainly mounted in a fuel cell automobile or the like. However, the present invention can also be applied to the other fuel cell systems such as a stationary fuel cell system. In such an application, too, it is possible to prevent the hydrogen system parts from being damaged when, for instance, external force is applied to the fuel cell system.

INDUSTRIAL APPLICABILITY

As described above, the fuel cell system according to the present invention can prevent hydrogen system parts from being damaged by external force, and the present invention is useful for various fuel cell systems.

The invention claimed is:

1. A fuel cell system for a vehicle, comprising:
fuel cell stacks for generating electrical power upon receipt of hydrogen gas and oxidized gas;
hydrogen system parts for supplying hydrogen gas to the fuel cell stacks;
a stack case for housing at least the fuel cell stacks and the hydrogen system parts,
a support member on which the hydrogen system parts are mounted, the hydrogen system parts are mounted to the support member via joints;
an end plate having the support member connected at one end and the fuel cell stacks connected at another end; and
hydrogen gas inlet and outlet pipes which are located outside of the stack case,
wherein the hydrogen system parts include a hydrogen inlet valve, a regulator, a hydrogen pump, a gas-liquid separator, and a hydrogen discharge valve, the parts are located inside the stack case so that they can be protected even in the event of a vehicle crash, and wherein the end plate and support member provide rigidity to the system so that even in the event of a vehicle crash the joints of the hydrogen system parts are prevented from being cracked or moved due to an unbalanced load imposed thereon.

2. The fuel cell system according to claim 1, wherein the stack case houses oxygen system parts for supplying oxidized gas to the fuel cell stacks or cooling system parts for supplying a coolant to the fuel cell stacks.

3. The fuel cell system according to claim 1, wherein the points of inserting the hydrogen supply pipe and hydrogen discharge pipe into the stack case are positioned rearward in the direction of vehicle travel.

* * * * *